United States Patent
Narayanan et al.

(10) Patent No.: US 10,296,908 B2
(45) Date of Patent: *May 21, 2019

(54) SYSTEM AND METHOD FOR SECURE PAYMENT TRANSACTIONS DURING A CHAT SESSION

(71) Applicant: Sutherland Global Services, Inc., Pittsford, NY (US)

(72) Inventors: Surya S. Narayanan, Bangalore (IN); Natarajan Kumaravelu, Chennai (IN); Srinivasa Rao Madala, Chennai (IN); K Pazhanisamy, Chennai (IN); Ramkrishnan Nk, Kerala (IN)

(73) Assignee: Sutherland Global Services, Inc., Pittsford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/934,114

(22) Filed: Mar. 23, 2018

(65) Prior Publication Data
US 2018/0211254 A1    Jul. 26, 2018

Related U.S. Application Data

(62) Division of application No. 14/663,810, filed on Mar. 20, 2015, now Pat. No. 9,953,320.

(30) Foreign Application Priority Data

Mar. 20, 2014  (IN) .......................... 1502/CHE/2014

(51) Int. Cl.
*G06K 7/00* (2006.01)
*G06Q 20/40* (2012.01)
(Continued)

(52) U.S. Cl.
CPC ....... *G06Q 20/401* (2013.01); *G06F 21/6245* (2013.01); *G06Q 20/382* (2013.01); *H04L 12/1813* (2013.01); *H04L 12/1822* (2013.01)

(58) Field of Classification Search
USPC .................. 235/375, 379, 380; 705/5, 35–45
See application file for complete search history.

(56) References Cited

U.S. PATENT DOCUMENTS

| | | | |
|---|---|---|---|
| 5,907,677 | A | 5/1999 | Glenn et al. |
| 6,901,379 | B1 | 5/2005 | Balter et al. |

(Continued)

FOREIGN PATENT DOCUMENTS

GB    2449848 A    12/2008

OTHER PUBLICATIONS

"Partnership Enables Secure Payments via Online Chat," http://cardnotpresent.com/news/cnp-newsaug13/Partnership_Enables_Secure_Payments_via_Online_Chat_-_Aug_29,_2013/.

(Continued)

*Primary Examiner* — Matthew Mikels
(74) *Attorney, Agent, or Firm* — Woods Oviatt Gilman LLP; Dennis B. Danella, Esq.

(57) ABSTRACT

A method for secure payment transactions over a network between a support help desk computing system and a customer computing system is provided. The method includes establishing a chat session between the help desk and the customer using a chat application program; receiving a purchase order from the customer; communicating a unique URL payment link to the customer, wherein the URL payment link is configured for allowing the customer to establish communication with an order processing system to provide sensitive payment information to the order processing system; receiving the sensitive payment information at the order processing system communicated from the cus- (Continued)

tomer; encrypting the sensitive payment information; providing the encrypted sensitive payment information to the help desk, wherein the encrypted sensitive payment information is displayed in a masked format on a display of the help desk; and completing the purchase order using the encrypted sensitive payment information.

16 Claims, 13 Drawing Sheets

(51) Int. Cl.
*H04L 12/18* (2006.01)
*G06F 21/62* (2013.01)
*G06Q 20/38* (2012.01)

(56) References Cited

U.S. PATENT DOCUMENTS

| | | | |
|---|---|---|---|
| 7,686,214 B1 | 3/2010 | Shao et al. | |
| 7,751,565 B2 | 7/2010 | Yuen | |
| 7,873,573 B2 | 1/2011 | Realini | |
| 8,156,324 B1 | 4/2012 | Shnowske et al. | |
| 8,175,975 B2 | 5/2012 | Cai et al. | |
| 8,335,994 B2 | 12/2012 | So | |
| 8,584,202 B2 | 11/2013 | Radhakrishnan | |
| 9,953,320 B2* | 4/2018 | Narayanan | H04L 12/1822 |
| 2002/0178087 A1 | 11/2002 | Henderson et al. | |
| 2006/0095320 A1 | 5/2006 | Jones | |
| 2006/0143095 A1 | 6/2006 | Sandus et al. | |
| 2007/0011104 A1* | 1/2007 | Leger | G06Q 20/085 705/77 |
| 2008/0201266 A1* | 8/2008 | Chua | G06O 20/12 705/67 |
| 2009/0192944 A1 | 7/2009 | Sidman et al. | |
| 2011/0112901 A1 | 5/2011 | Fried et al. | |
| 2012/0005038 A1* | 1/2012 | Soman | G06Q 20/12 705/26.41 |
| 2012/0084201 A1 | 4/2012 | Ostrovsky | |
| 2013/0304638 A1 | 11/2013 | Schoenberg | |
| 2014/0058939 A1 | 2/2014 | Savla | |

OTHER PUBLICATIONS

Gao, Jerry, et al. "P2P-Paid: A peer-to-peer wireless payment system." Mobile Commerce and Services, 2005. WMCS'05. The Second IEEE International Workshop on. IEEE, 2005.

* cited by examiner

# SYSTEM AND METHOD FOR SECURE PAYMENT TRANSACTIONS DURING A CHAT SESSION

CROSS-REFERENCE TO RELATED APPLICATIONS

This application is a divisional of U.S. patent application Ser. No. 14/663,810, filed on Mar. 20, 2015, which claims priority under 35 U.S.C. § 119(a)-(d) to Indian Patent Application No. 1502/CHE/2014, filed Mar. 20, 2014, both of which are hereby incorporated by reference in their entirety.

FIELD OF THE INVENTION

The present invention relates to a system and method for providing secure payment during a chat session conducted over a network. More particularly, the system and method allows for a secure payment transaction for a product or service ordered during the chat session, and more particularly the system and method prevents a customer service representative of a support desk center from viewing a customer's credit card information or other personal information provided by the customer in order to complete the transaction during the chat session.

BACKGROUND OF THE INVENTION

End customers typically reach out to a customer support desk center to (a) address issues that they are facing with their products; (b) seek information on products that they have purchased; or (c) to purchase a service or product. Customers reach out to support desk centers through different support channels such as phone, e-mail or chat through a network. It is also likely that during the process of a customer interaction, a customer service representative or associate may be able to convince a customer to upsell a product or service. In those customer-associate interactions, where there is a need for the customer to purchase something, the resulting transactions are typically handled through credit card payments. Traditionally the customer would provide the credit card information to the associate verbally, who would then go ahead and complete the order on behalf of the customer. This introduces serious risk because of the exposure of sensitive credit card information to the associate. It is also likely that this information is captured as part of the voice quality recording during such transactions.

For example, if in need of assistance, a customer may reach a customer support desk center through online chat. Upon initiation of an online chat session, the customer support desk center may assign a chat associate to engage with the customer. During the chat dialogue, the associate discusses with customer the underlying issues and, ideally comes to an understanding of the issue or problem causing the need for the customer service chat. As the associate is becoming aware to the problem that the customer is facing or what the customer may require to alleviate the issue, the associate may find the need to sell a product or service plan to customer. Ideally, the product or service can be purchased through an online sale through billing the customer's credit card for the required product or service. Generally, to complete a sale, the associate will complete the order details of the product to be purchased and collects the credit card information from the customer through the established chat channel, wherein the customer provides the associate with the credit card information. The credit card information is then inputted by the associate and verified thereby completing the sales process and placing the order through customer support desk center's (or other third party's) order processing system.

While the above scenario has served customer support services in the past, there are, however, a number of shortcomings to this approach. First, communicating credit card information through chat is insecure and may be susceptible to malicious activity of identity thieves or other internet hackers. Secondly, the transaction processing is not automatic and it is time consuming for an associate as all credit card related information is exchanged serially over the chat channel (an individual chat stream is limited in the number of characters which may be typed into the chat window). In a more nefarious situation, an unscrupulous associate may intentionally misuse a customer's credit card details for personal gain. Alternatively, a customer's credit card information may get recorded through screen recording/capture where it can then be viewed by people other than associate.

As such, there is a need for a system and method that provides for secure online credit card transactions through a chat channel wherein a customer's credit card information is securely transmitted to an order processing system without the need for providing such credit card information to the customer support desk center's associate. Further, there is also a need for a method and system for protecting any other sensitive information communicated over a chat session, such as, but not limited to, a customer's social security number or bank account numbers. The present invention addresses these and other needs.

BRIEF SUMMARY OF THE INVENTION

In order to overcome the above stated problems, the present invention a method for secure payment transactions over a network between a support help desk computing system and a customer computing system is provided. In one aspect, the method comprises: establishing a chat session between the support help desk computing system and the customer computing system through the network using a chat application program; receiving a purchase order from the customer computing system during the chat session; communicating a unique Uniform Resource Locator (URL) payment link to the customer computing system during the chat session in response to receipt of the purchase order, wherein the URL payment link is configured for allowing the customer computing system to establish communication with an order processing system over the network to provide sensitive payment information to the order processing system, wherein the sensitive payment information is provided in association with the purchase order; receiving the sensitive payment information at the order processing system communicated from the customer computing device; encrypting the sensitive payment information; providing the encrypted sensitive payment information to the support help desk computing system, wherein the encrypted sensitive payment information is displayed in a masked format on a display of the support help desk computing system; and completing the purchase order using the encrypted sensitive payment information.

In another aspect, the method comprises: establishing a chat session between the support help desk computing system and the customer computing system through the network using a chat application program; receiving a purchase order from the customer computing system during the chat session, wherein the purchase order is a request to purchase at least one of a product or a service; receiving non-sensitive payment information from the customer computing system during the chat session in response to the purchase order, wherein the non-sensitive personal information includes at least one of a customer name, mailing address, billing address, or email address; requesting a unique Uniform Resource Locator (URL) payment link from the order processing system in response to the purchase order, wherein the URL payment link is configured for allowing the customer computing system to establish communication with an order processing system over the network to provide sensitive payment information to the order processing system, wherein the sensitive payment information includes at least one of credit card information, social security number, bank account number, or bank account routing number; obtaining the URL payment link from the order processing system; communicating the URL payment link to the customer computing system during the chat session; receiving the sensitive payment information at the order processing system communicated from the customer computing device; encrypting the sensitive payment information using the order processing system; providing the encrypted sensitive payment information to the support help desk computing system, wherein the encrypted sensitive payment information is displayed in a masked format on a display of the support help desk computing system; and completing the purchase order using the non-sensitive and sensitive payment information.

In another aspect, a support help desk computing system for providing a secure payment transaction during a chat session with a customer computing device is provided. The system comprises a chat application program, an order processing system, and a display. The chat application program is configured for establishing a chat session with the customer computing device over a network, wherein the chat application program is configured for receiving a purchase order from the customer computing system during the chat session. The order processing system is configured for generating a unique Uniform Resource Locator (URL) payment link in association with the purchase order for communication to the customer computing device during the chat session using the chat application program. The URL payment link is configured for allowing the customer computing system to establish communication with the order processing system over the network to provide sensitive payment information to the order processing system. The sensitive payment information is provided in association with the purchase order, wherein the order processing system is configured for encrypting the sensitive payment information. The order processing system is configured for displaying the encrypted sensitive payment information in a masked format on the display, and completing the purchase order using the encrypted sensitive payment information.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Generally, the tools and methods described herein for providing secure payment for goods or services that are ordered by a customer during a chat session may be implemented in hardware, software or a combination thereof. As will be discussed in more detail below, the system and method is configured for preventing a customer service representative of a support help desk center from viewing or otherwise obtaining a customer's credit card information or other personal information provided by the customer in order to complete the transaction during the chat session.

This document is organized as follows. In the first section, an overview of the techniques and implementation is provided and is described with reference to some component devices and aspects of the invention. In the next section, an exemplary algorithm for providing the method in accordance with one aspect of the present invention is discussed. Finally, an exemplary computer environment for the implementation and use of the invention is described.

Figure 1:
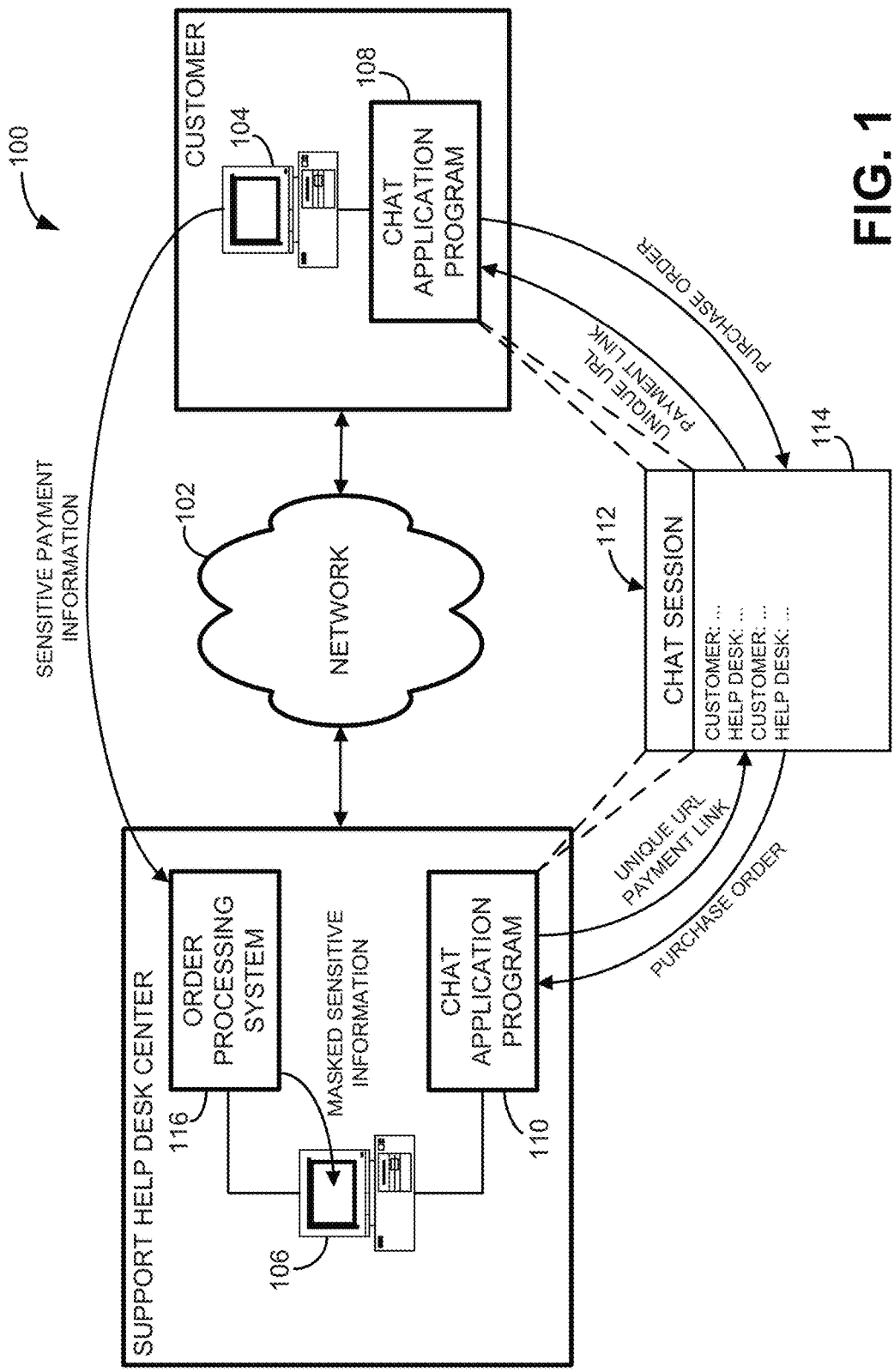
FIG. 1 generally illustrates a networking environment in which the present invention may be implemented including flow diagrams showing certain aspects of the present invention.

Any exemplary environment or system to which the present invention would be applicable is shown in FIG. 1 and is designated as reference numeral 100. The environment 100 may include a network 102, such as a Local Area Network (LAN), Wide Area Network (WAN), the Internet, wireless network or other similar configuration for allowing communication among two or more computing devices. Connected to the network 102 may be one or more general purpose computing devices. Computing devices include devices such as, but not limited to, a desktop personal computer, laptop computer, mobile or handheld device, which may be a wired or wireless device, which may be located in a home, office or other environment. Network 102 is used to place a customer computing system 104 in communication with a support help desk computing system 106.

Support help desk computing system 106 is operated by and under the control of a business entity that employs or otherwise engages customer service representatives or associates that are trained to resolve issues that customers are facing with respect to products that were purchased by the customer, provide information to customers on products that the customer has purchased, and sell additional services or products to customers. Typically, one or more customer service representatives are operating the support help desk computing system 106.

Customer computing system 104 is operated by a customer that purchased a product or service, and which has an issue that needs to be resolved with respect to the purchased product or service, is seeking information about the purchased product or service, or is seeking to purchase a product or service. In the instance that the customer has an issue that needs to be resolved with respect to the purchased product or service, or is seeking information about the purchased product or service, it is not necessarily the case that the customer initially purchased the product or service from the business entity in control of the support help desk computing system 106. In some instances, business entities that sell products or services to its customers outsource troubleshooting and other post-sale activities to third-party business entities that specialize in support help desk services. Therefore, it should be understood that the use of the word "customer" herein indicates that a product or services was either purchased from the business entity in control of the support help desk computing system 106 or purchased from another business entity.

Both customer computing system 104 and support help desk computing system 106 may include a chat application program 108, 110 that is configured for establishing a chat session 112 over network 102 between two or more computing systems. It should be understood that chat application 108, 110 may be stored in a memory of customer computing system 104 or support help desk computing system 106, respectively, or may be a web-driven application that is accessible through network 102. Chat session 112 is configured for allowing for a real-time exchange of communications, typically in the form of text messages, between the customer and customer service representative within a chat application window 114 that appears on a display of both customer computing system 104 and support help desk computing system 106. The chat session 112 allows the customer to communicate the product or service related issue to the customer service representative, and for the customer service representative to communicate information to the customer to resolve the issue or fulfill a customer request. Chat session 112 allows the customer to communicate to the customer service representative that the customer would like to purchase at least one of a product or service, such as, but not limited to, a replacement part for a product, a service plan for a product, or a virus protection software program. The customer's communication to the customer service representative during chat session 112 indicating that the customer would like to make such a purchase is referred to herein as a purchase order.

Support help desk computing system 106 further includes an order processing system 116 configured for completing the purchase order by processing payment information provided by the customer using customer computing device 104. In one aspect, chat application program 110 may be built as a shell or software module within order processing system 116. The payment information that order processing system 116 uses to complete the purchase order includes non-sensitive and sensitive payment information. The non-sensitive payment information is provided by the customer to the customer service representative during chat session 112. Non-sensitive payment information includes, but is not limited to, the customer's name, mailing address, billing address, or e-mail address. In accordance with one aspect of the present invention, sensitive payment information is not provided by the customer by entering such information in chat session 112 using customer computing device so that customer service representative can view the sensitive payment information in chat session 112 using support help desk computing system 106. Sensitive payment information includes at least one of, but is not limited to, credit card information, social security number, bank account number, or bank account routing number. Credit card information may include at least one of a credit card number, credit card expiration date, or a three-digit security code. From the customer's perspective, it is not desirable to provide sensitive payment information in written format during chat session 112 due to the possibility that the sensitive payment information could be acquired by an unauthorized third party, or misused by customer service representative.

In accordance with one aspect of the present invention, order processing system 116 is configured for generating a unique Uniform Resource Locator (URL) payment link after the purchase order is communicated by customer computing device 104 to support help desk computing device 106 during chat session 112. In particular, support help desk computing device 106 is used to make a request to order processing system 116 to generate the unique URL payment link. The URL payment link is unique in the sense that it is generated specifically with reference to the purchase order made by the customer computing device 104. Order processing system 116 is configured for providing support help desk computing device 106 with the URL payment link so that the URL payment link can be provided to and displayed on customer computing device over the chat session 112. The URL payment link is configured to allow the customer to establish communication with order processing system 116 using, for example, a separate website browser window, over network 102. Within the separate browser window, customer computing system 104 is used to provide the sensitive payment information required to complete the associated purchase order. The order processing system 116 is configured for encrypting the sensitive payment information received from the customer computing system so that the sensitive payment information is displayed on support help desk computing system 106 in a masked format. The sensitive payment information is displayed in a masked format so that the customer service representative operating the support help desk computing system 106 is not able to view or otherwise obtain the sensitive payment information on the display of the support help desk computing system 106. The masked format can be any format that does not reveal the actual sensitive payment information of the customer, such as, for example, replacing the sensitive payment information with one or more asterisks. While the above-referenced encryption process is referred to above as a process of taking the sensitive payment information and placing such information in a masked format, it should be understood that the encryption may also, optionally, include a process of further securing the sensitive payment information during the communication from customer computing system 104 to order processing system 116, or storage of such data by order processing system 116, using other known encryption techniques, such as, but not limited to, Secure Socket Layer (SSL) encryption, Advanced Encryption Standard (AES), and the like.

After receiving the non-sensitive and sensitive payment information, order processing system 116 is configured to complete the purchase order by interacting with a third party business entity to receive payment for the purchased products or services, for example, through a typical authorization-capture credit card transaction, automated clearing house (ACH) transaction, or wire transfer. It will be understood that order processing system 116 may be implemented in hardware, software or a combination thereof to perform the functions described above. Further, while order processing system 116 has been shown and described as being a component of support help desk computing system 106, it will be understood that order processing system 116 may instead be controlled by one or more business entities that is different than the business entity that controls the support help desk computing system 106. Further, in another aspect, a system other than order payment processing system 116 may be used to generate the URL payment link and perform the above-referenced functions relating to providing the sensitive payment information in the masked format, while still allowing order processing system 116 to complete the purchase order.

Figure 2:
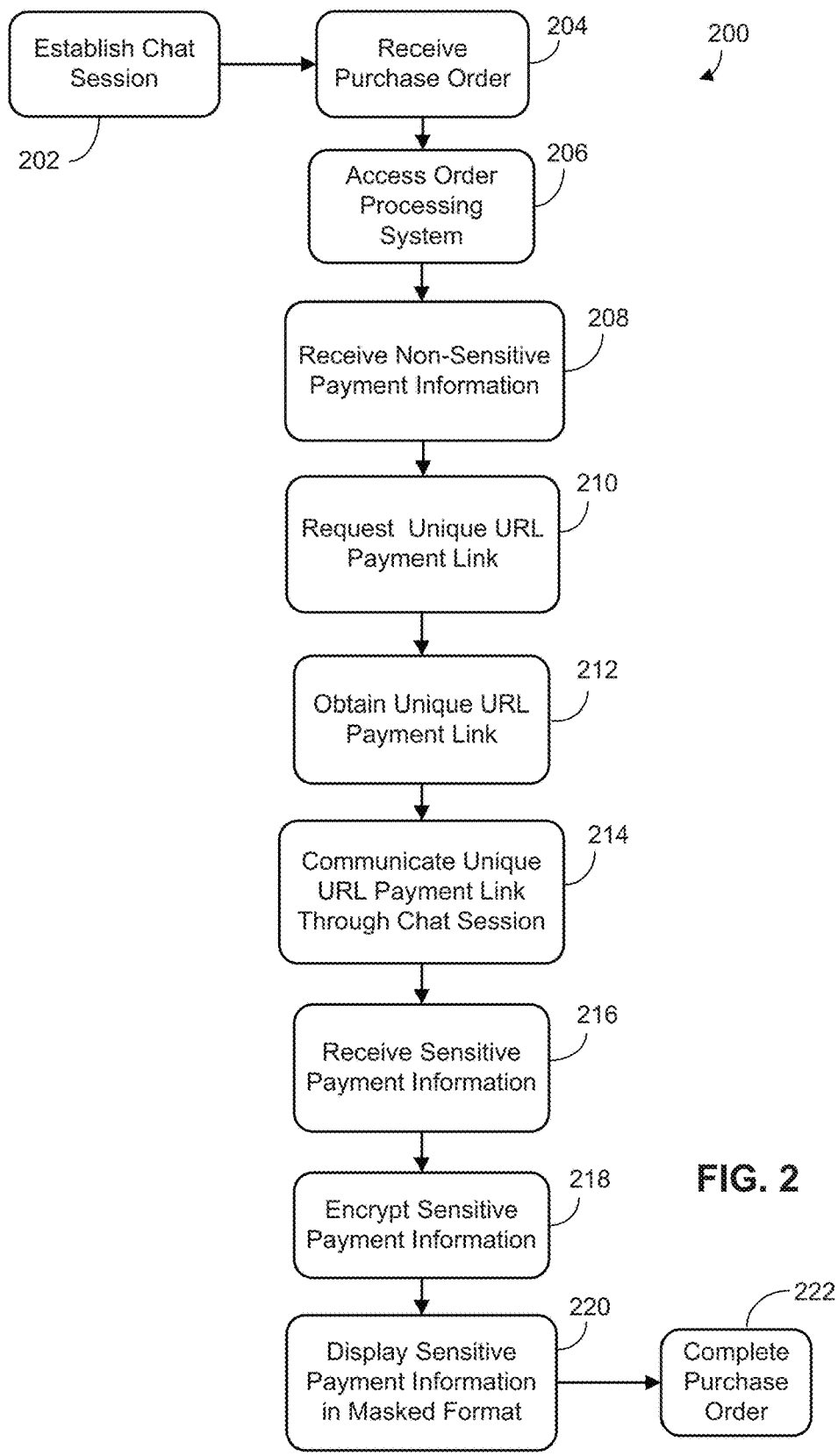
FIG. 2 is a schematic flow diagram showing a method in accordance with one aspect of the present invention.

Having described an exemplary system 100 in accordance with an aspect of the present invention, an exemplary method 200 for a secure payment transaction over network 102 between support help desk computing system 106 and customer computing system 104 will be now be described with reference to FIGS. 1 and 2. Method 200 includes establishing chat session 112 between support help desk computing system 106 and the customer computing system 104 through the network using chat application program 110 at step 202. After chat session is established, the customer and customer service representative communicate using chat application window 114. During chat session 112, the issue or request made by the customer is understood by customer service representative, and at least one of a product or service is either offered to the customer using support help desk computing system 106 or requested by customer using customer computing system 104. This results in the purchase order being received by support help desk computing system 106 from customer computing device 104 during chat session 112 at step 204.

Figure 3:
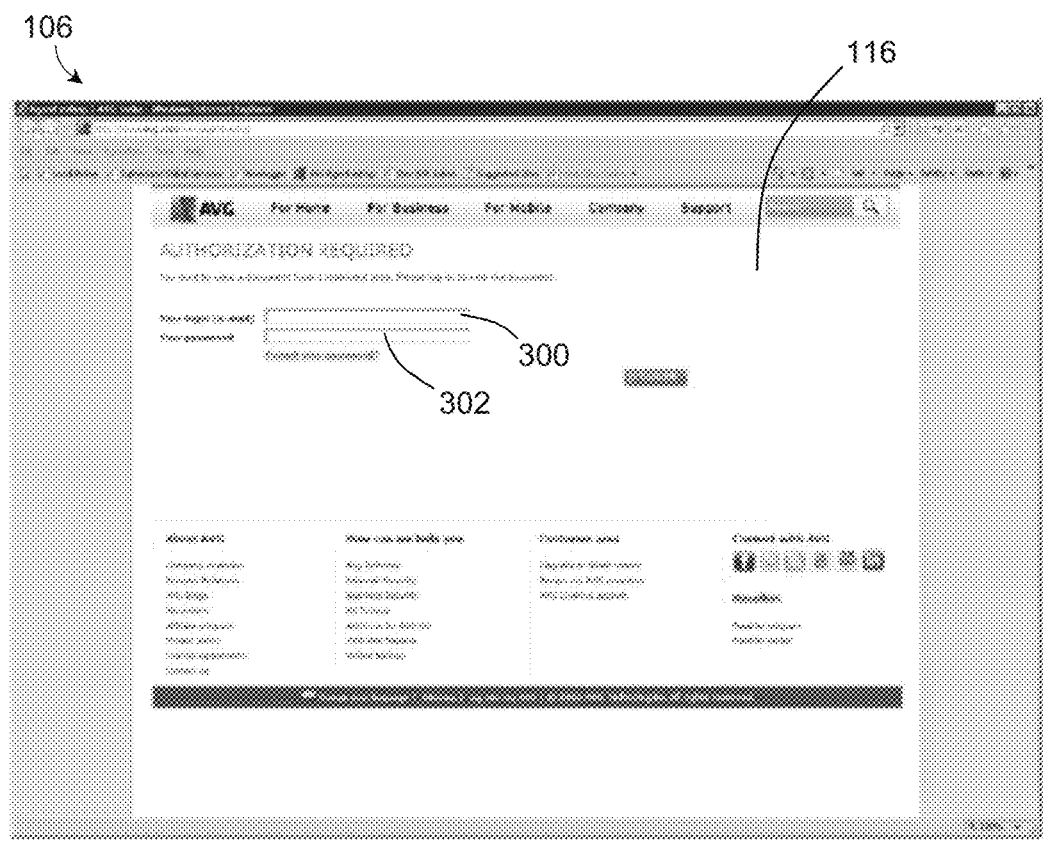
FIGS. 3-12 show exemplary screen shots of a display of a support help desk computing system showing a work flow of an order processing system.
Figure 4:
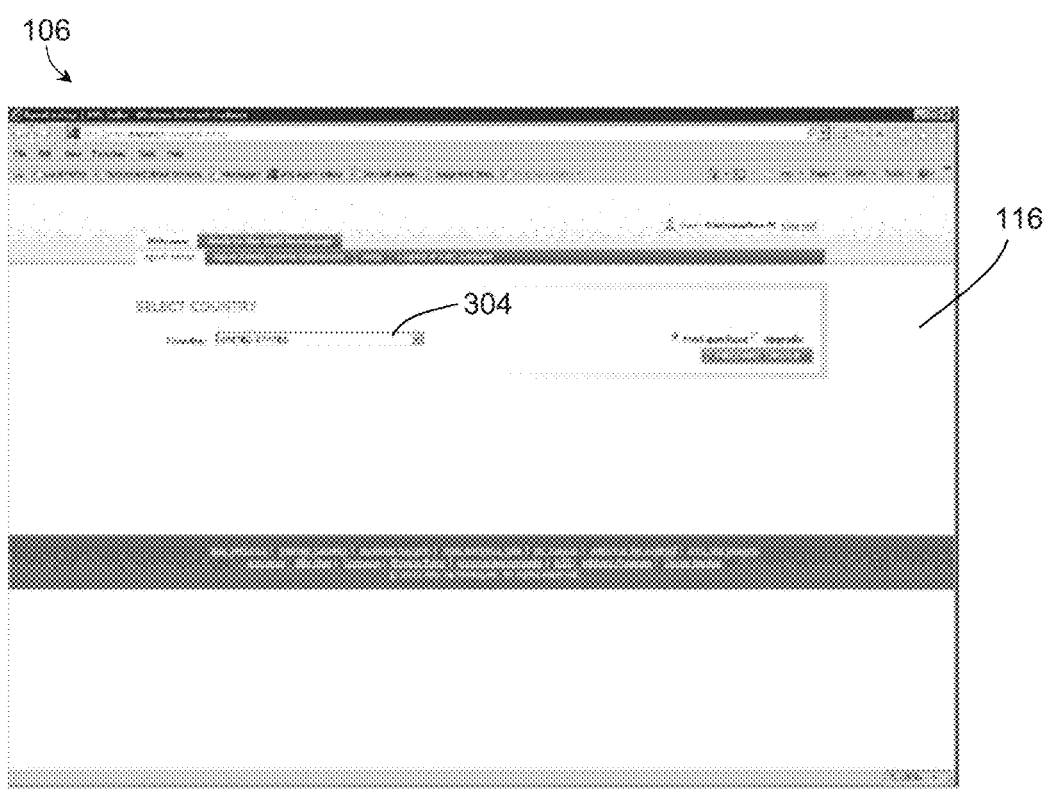
Figure 5:
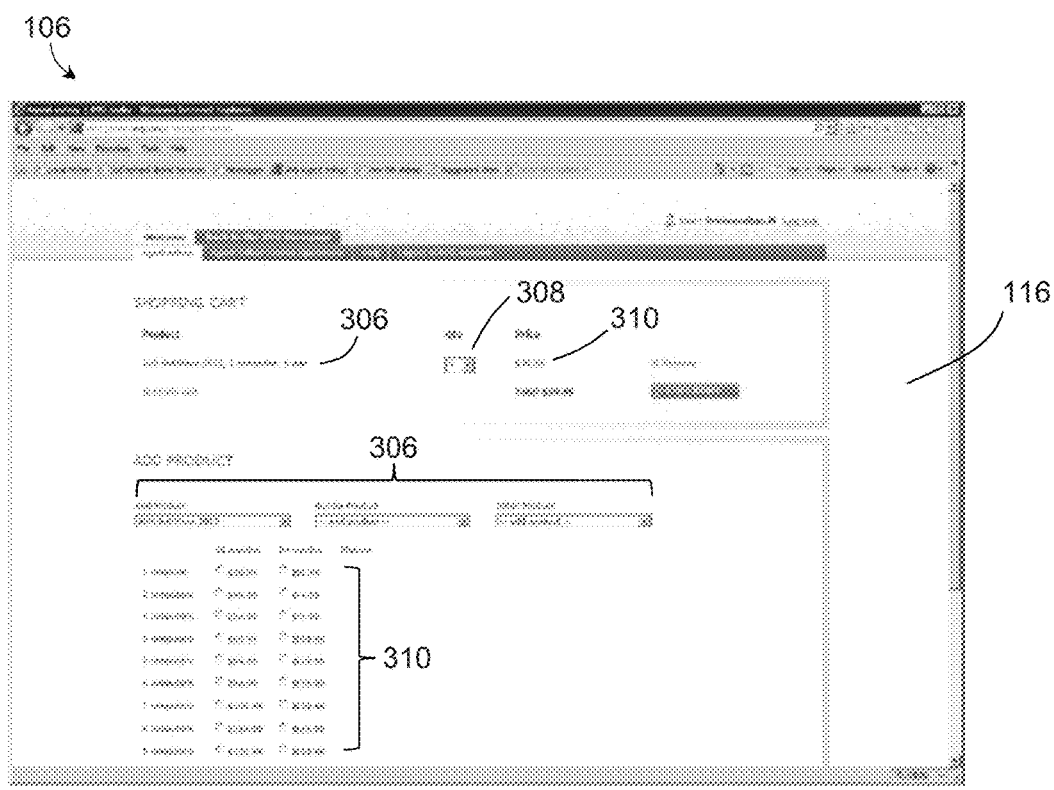
Figure 6:
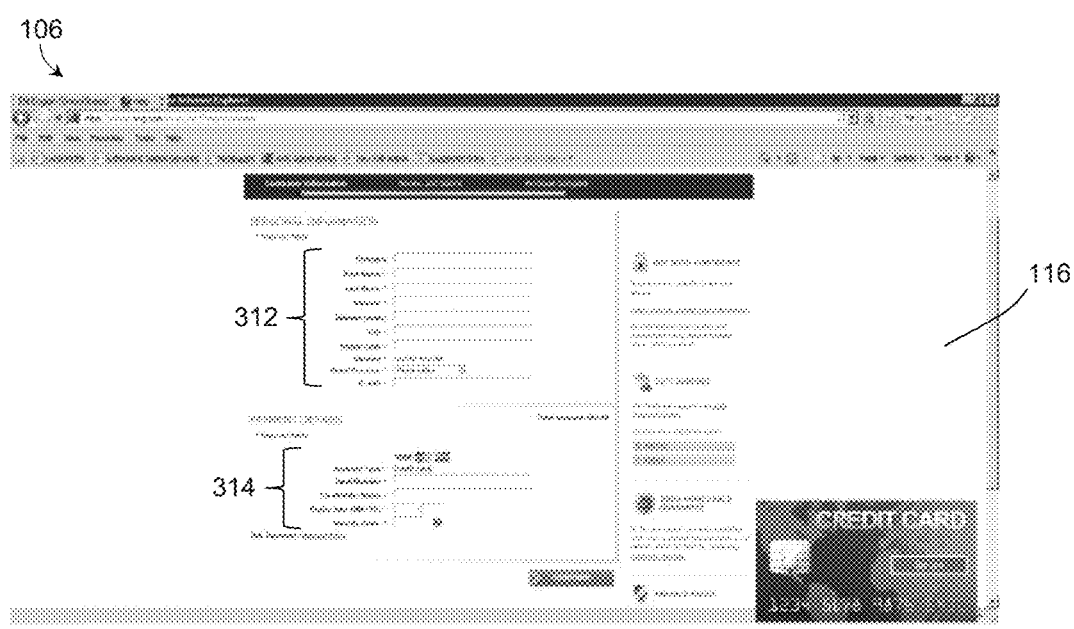

At step 206, order processing system 116 is accessed by customer service representative using support help desk computing system 106 by entering authorized credentials in a user name data field 300 and a password data field 302, as best seen in FIG. 3, and then selecting the country in which customer is located using a country drop down menu 304, as best seen in FIG. 4. As best seen in FIG. 5, using order processing system 116, the customer service representative using support help desk computing system 106 enters information relevant to the product or service associated with the purchase order, such as a name of the product or service 306, quantity of product or service 308, and price of the product or service 310. As best seen in FIG. 6, order processing system 116 displays on support help desk computing system 106 a series of data fields that include non-sensitive payment information 312 and sensitive payment information 314 that need to be provided by the customer in order to complete the purchase order. At step 208, non-sensitive payment information is received from customer computing system during chat session 112, and customer service representative enters the received non-sensitive payment information into the data fields 312 as seen in FIG. 7.

Figure 7:
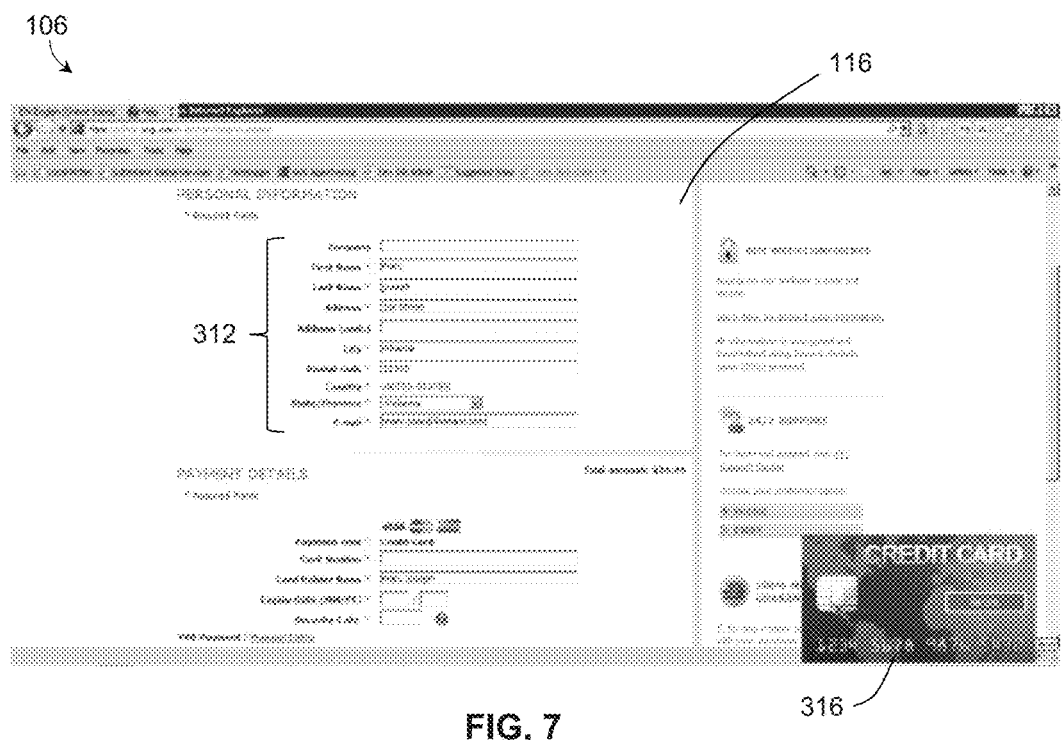
Figure 8:
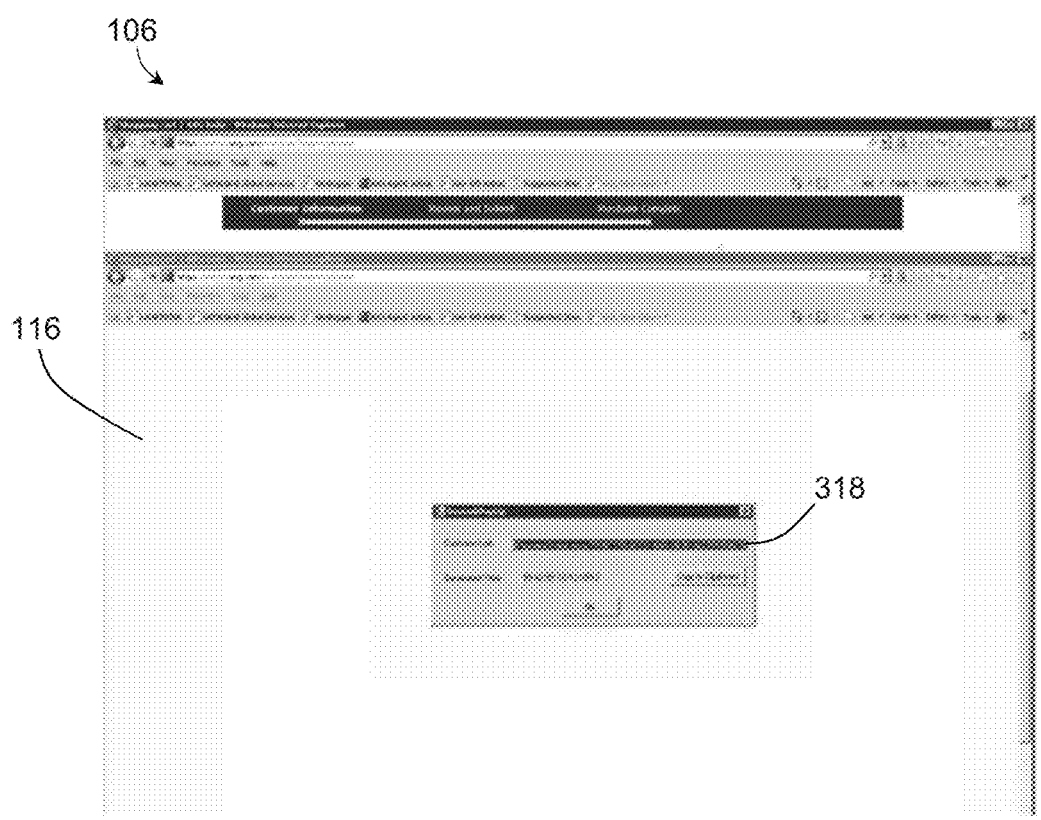

In accordance with one aspect of the present invention, order processing system 116 displays a secure payment request button 316 on a display of support help desk computing system 106, as best seen in FIG. 7. As best seen in FIGS. 2 and 7, secure payment request button 316 is clicked by the customer service representative to request the unique URL payment link from order processing system 116 at step 210. In response to step 210, as best seen in FIGS. 2 and 8, unique URL payment link 318 is generated by order processing system 116, and unique URL payment link 318 is displayed on support help desk computing system 106 at step 212. The support help desk computing system 106 is then used to communicate unique URL payment link 318 to customer computing system 104 through chat session 112 at step 214. For example, support help desk computing system 106 may be used to copy unique URL payment link 318 to a clipboard on support help desk computing system 106, and then pasting unique URL payment link 318 into chat session 112 so that unique URL payment link 318 can be communicated and then viewed by customer in chat application window 114 displayed on customer computing system 102.

Figure 9:
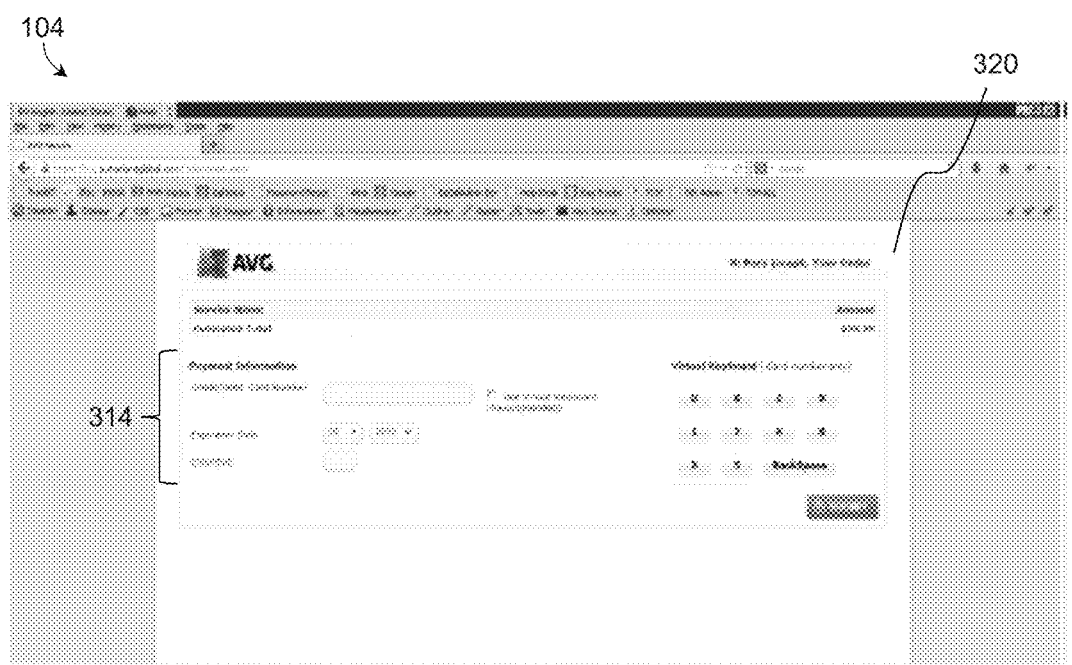
Figure 10:
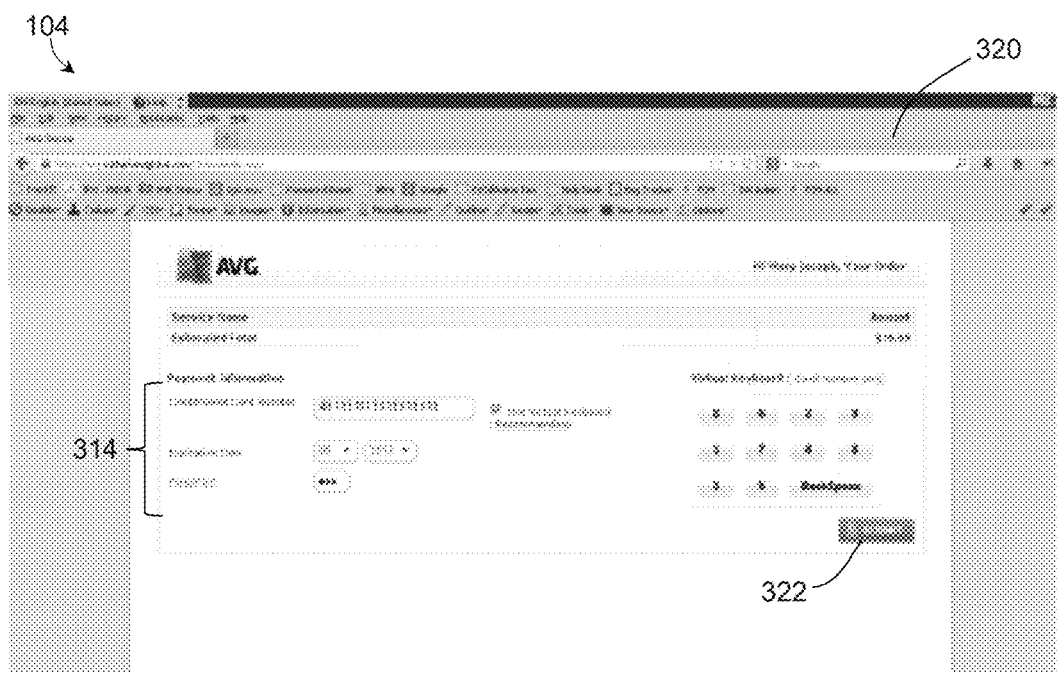
Figure 11:
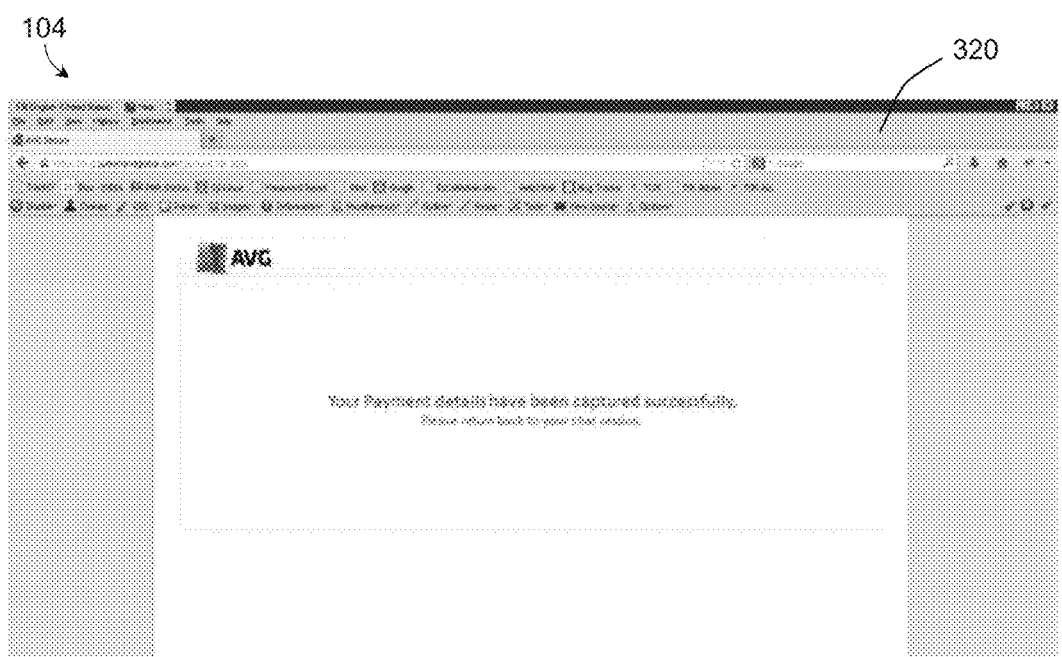
Figure 12:
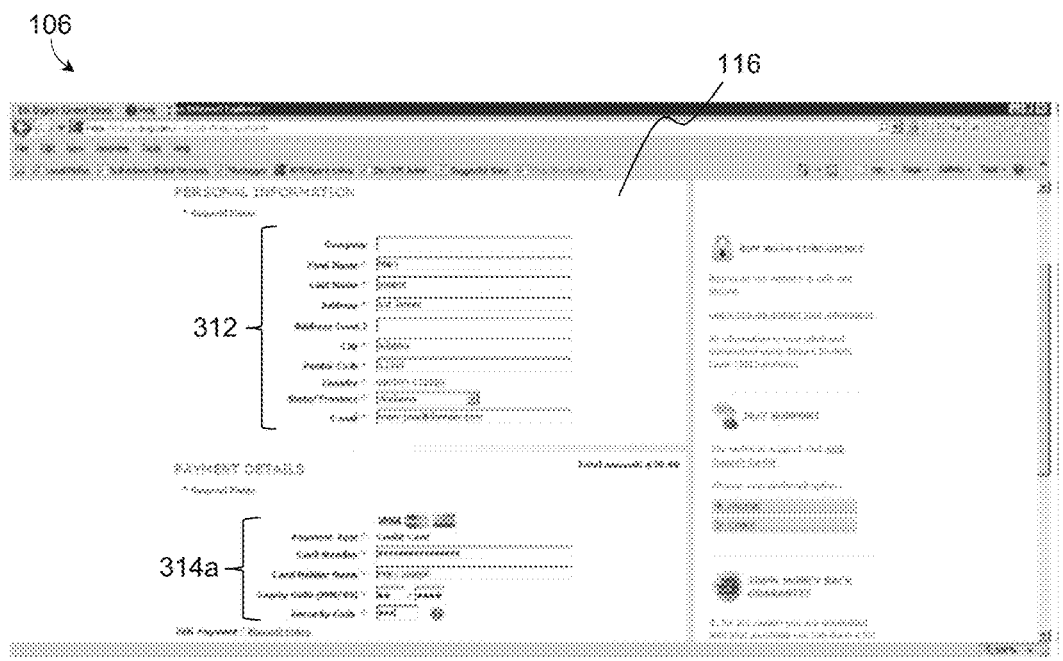

The customer can then either click unique URL payment link 318 within chat session 112 to automatically open a customer web application browser 320, or insert unique URL payment link 318 into customer web application browser 320, which places customer computing system 104 in communication with order processing system 116, as best seen in FIG. 9. As best seen in FIGS. 9-11, customer then proceeds to enter the sensitive payment information 314 using customer web application browser 320, and then clicks the submit button 322 to communicate sensitive payment information 314 to order processing system 116. The sensitive payment information 314 communicated by customer computing system 104 is received by order processing system 116 at step 216. At step 218, the sensitive payment information 314 received by order processing system 116 is then encrypted, and then displayed on a display of support help desk computing system 106 in a masked format 314a at step 220, as best seen in FIG. 12. At step 222, support help desk computing system 106 completes the purchase order using the non-sensitive and encrypted sensitive payment information, which results in the customer paying the support help desk center for the product or service associated with the purchase order.

As can be appreciated, the system and method described above overcomes the above-referenced drawbacks and deficiencies. For example, by providing a unique URL payment link to the customer, the customer is able to provide the order processing system with the sensitive payment information required to complete the transaction, while at the same time preventing the sensitive payment information from being displayed to the customer service representative during the chat session or while completing the transaction.

Having described the system and method of the present invention and an embodiment thereof, an exemplary computer environment for implementing the described design and execution is presented next.

Figure 13:
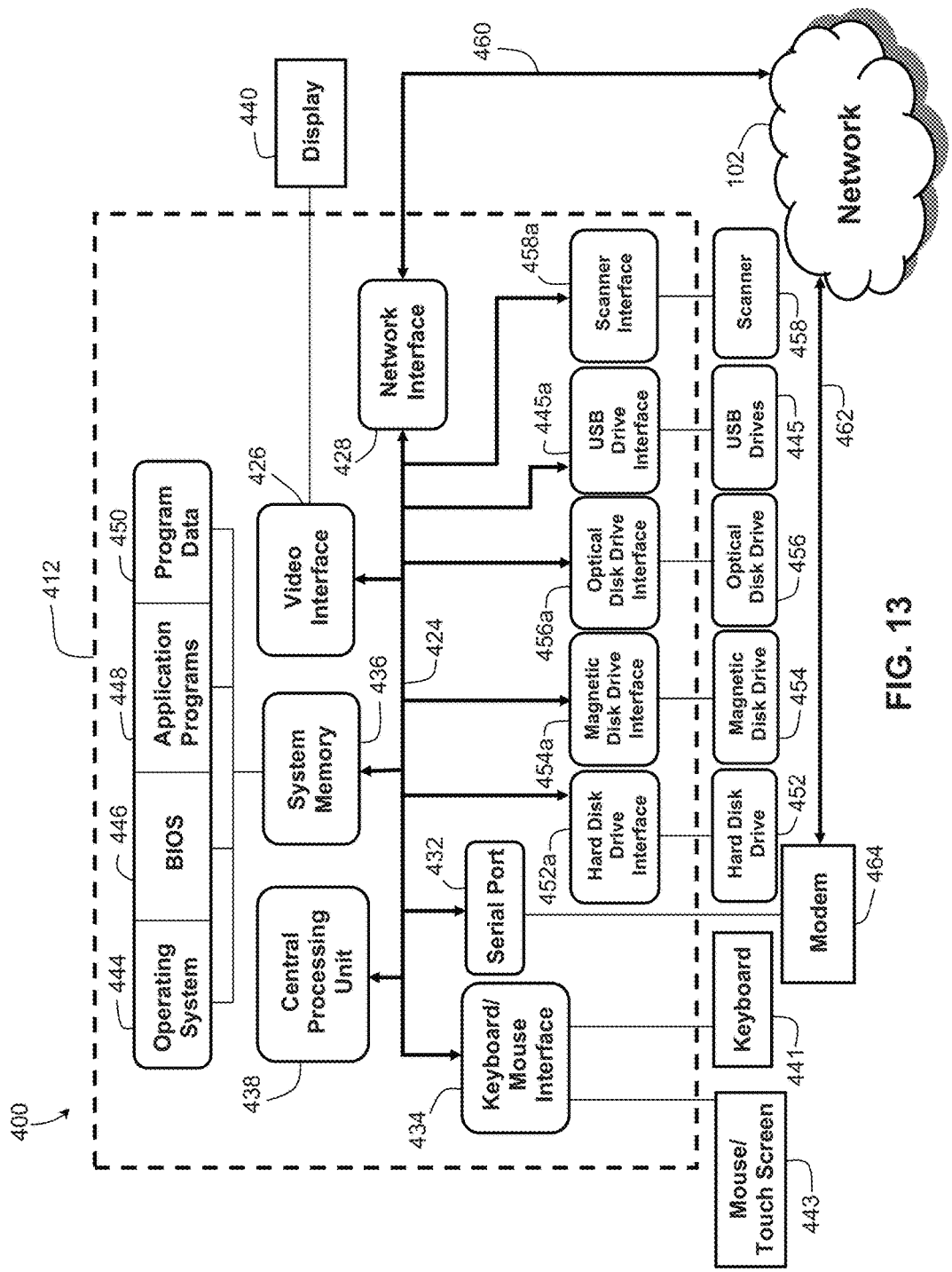
FIG. 13 is a block diagram generally illustrating a computing environment in which the invention may be implemented.

FIG. 13 shows an exemplary computing environment 400 that can be used to implement any of the processing thus far described. For example, computing environment 400 may be representative of customer computing system 104 or support help desk computing system 106. Computer 412 may be a computing device including a system bus 424 that couples a video interface 426, network interface 428, one or more serial ports 432, a keyboard/mouse interface 434, and a system memory 436 to a Central Processing Unit (CPU) 438. A monitor or display 440 is connected to bus 424 by video interface 426 and provides the user with a graphical user interface to view, edit, and provide input during chat session 112 or information required to complete the information requested in FIGS. 3-10 and 12. The graphical user interface allows the user to enter commands and information into computer 412 using a keyboard 441 and a user interface selection device 443, such as a mouse, touch screen or other pointing device. Keyboard 441 and user interface selection device are connected to bus 424 through keyboard/mouse interface 434. The display 440 and user interface selection device 443 are used in combination to form the graphical user interface which allows the user to implement at least a portion of the present invention. Other peripheral devices may be connected to computer through serial port 432 or universal serial bus (USB) drives 445 to transfer information to and from computer 412.

The system memory 436 is also connected to bus 424 and may include read only memory (ROM), random access memory (RAM), an operating system 444, a basic input/ output system (BIOS) 446, application programs 448 and program data 450. The computer 412 may further include a hard disk drive 452 for reading from and writing to a hard disk, a magnetic disk drive 454 for reading from and writing to a removable magnetic disk (e.g., floppy disk), and an optical disk drive 456 for reading from and writing to a removable optical disk (e.g., CD ROM or other optical media). The computer 412 may also include USB drives 445 and other types of drives for reading from and writing to flash memory devices (e.g., compact flash, memory stick/ PRO and DUO, SD card, multimedia card, smart media xD card), and a scanner 458. A hard disk interface 452a, magnetic disk drive interface 454a, an optical drive interface 456a, a USB drive interface 445a, and a scanner interface 458a operate to connect bus 424 to hard disk drive 452, magnetic disk drive 454, optical disk drive 456, USB drive 445 and a scanner 458, respectively. Each of these drive components and their associated computer-readable media may provide computer 412 with non-volatile storage of computer-readable instruction, program modules, data structures, application programs, an operating system, and other data for the computer 412, such as, but not limited to chat application program 108, 110 and order processing system 116. In addition, it will be understood that computer 412 may also utilize other types of computer-readable media in addition to those types set forth herein, such as digital video disks, random access memory, read only memory, other types of flash memory cards, magnetic cassettes, and the like.

The system 100 may operate in a networked environment using logical connections to establish communication between customer computing system 104, support help desk computing system 106, and order processing system 116. Network interface 428 provides a communication path 460 between bus 424 and network 102, which allows chat messages communicated during chat session 112, non-sensitive payment information 312, and sensitive payment information 314 to be communicated through network 102 between customer computing system 104, support help desk computing system 106, and order processing system 116 using computer 412, as described above. This type of logical network connection is commonly used in conjunction with a local area network (LAN). Chat messages communicated during chat session 112, non-sensitive payment information 312, and sensitive payment information 314 may also be communicated from bus 424 through a communication path 462 to network 102 using serial port 432 and a modem 464. Using a modem connection between customer computing system 104, support help desk computing system 106, and order processing system 116 is commonly used in conjunction with a wide area network (WAN). It will be appreciated that the network connections shown herein are merely exemplary, and it is within the scope of the present invention to use other types of network connections between customer computing system 104, support help desk computing system 106, and order processing system 116 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A support help desk computing system for providing a secure payment transaction during a chat session with a customer computing device, the support help desk computing system comprising:
   a chat application program including computer executable instructions configured for establishing a chat session between the support help desk computing system and the customer computing device over a network, wherein the support help desk computing system is configured for receiving a purchase order from the customer computing device during the chat session;
   an order processing system including computer executable instructions configured for generating a unique Uniform Resource Locator (URL) payment link in association with the purchase order at the request of the support help desk computing system, wherein the unique URL payment link is communicated by the support help desk computing system to the customer computing device during the chat session using the chat application program in response to receiving the purchase order, wherein the unique URL payment link is configured for allowing the customer computing device to establish communication with the order processing system over the network to provide sensitive payment information to the order processing system, wherein the sensitive payment information is provided in association with the purchase order, wherein the order processing system is configured for encrypting the sensitive payment information; and
   a display,
   wherein the order processing system is configured for displaying the encrypted sensitive payment information in a masked format on the display, and wherein the order processing system is configured for completing the purchase order using the encrypted sensitive payment information.

2. A support help desk computing system in accordance with claim 1, wherein the purchase order is a request to purchase at least one of a product or a service.

3. A support help desk computing system in accordance with claim 1, wherein the sensitive payment information includes credit card information, wherein credit card information includes at least one of a credit card number, credit card expiration date, and a three-digit security code.

4. A support help desk computing system in accordance with claim 1, wherein sensitive payment information includes at least one of a social security number, bank account number, or bank account routing number.

5. A support help desk computing system in accordance with claim 1, wherein the chat application program is configured for receiving non-sensitive information from the customer computing device during the chat session in response to the purchase order, and displaying the non-sensitive information on the display, wherein non-sensitive personal information includes at least one of a customer name, mailing address, billing address, or email address.

6. A support help desk computing system in accordance with claim 5, wherein the order processing system is configured for completing the purchase order using the sensitive and non-sensitive payment information.

7. A support help desk computing system in accordance with claim 1, wherein the masked format includes representing the sensitive payment information as one or more asterisks.

8. A support help desk computing system in accordance with claim 1, further comprising a memory, wherein the chat application program is stored in the memory.

9. A support help desk computing system in accordance with claim 1, further comprising a memory, wherein the order processing system is stored in the memory.

10. A support help desk computing system in accordance with claim 1, wherein the chat application program is a software module within the order processing system.

11. A system for providing a secure payment transaction during a chat session, the system comprising:
a support help desk computing system including a display;
a chat application program including computer executable instructions configured for establishing a chat session between the support help desk computing system and a customer computing device over a network, wherein the support help desk computing system is configured for receiving a purchase order from the customer computing device during the chat session; and
an order processing system including computer executable instructions configured for, upon receiving a request from the support help desk computing system, generating a unique Uniform Resource Locator (URL) payment link in association with the purchase order, wherein the unique URL payment link is communicated by the support help desk computing system to the customer computing device during the chat session using the chat application program, wherein the unique URL payment link is configured for allowing the customer computing device to establish communication with the order processing system over the network to provide sensitive payment information to the order processing system, wherein the sensitive payment information is provided in association with the purchase order, wherein the order processing system is configured for encrypting the sensitive payment information,
wherein the order processing system is further configured for allowing the encrypted sensitive payment information to be displayed in a masked format on the display of the support help desk computing system, and wherein order processing system is configured for completing the purchase order using the encrypted sensitive payment information.

12. A system in accordance with claim 11, wherein the chat application program is a web-driven application that is accessible by the support help desk computing system and the customer computing device over the network.

13. A system in accordance with claim 11, wherein the support help desk computing system further comprises a memory, and wherein the chat application program is stored in the memory.

14. A system in accordance with claim 11, wherein the support help desk computing system further comprises a memory, and wherein the order processing system is stored in the memory.

15. A system in accordance with claim 11, wherein the chat application program is a software module within the order processing system.

16. A non-transitory computer-readable medium having thereon computer-executable instructions for performing a method for secure payment transactions over a network between a support help desk computing system and a customer computing system, the method comprising:
establishing a chat session between the support help desk computing system and the customer computing system through the network using a chat application program;
receiving, at the support help desk computing system, a purchase order from the customer computing system during the chat session;
requesting a unique Uniform Resource Locator (URL) payment link from an order processing system using the support help desk computing system in response to the purchase order;
communicating the unique URL payment link from the support help desk computing system to the customer computing system over the chat session in response to receipt of the purchase order, wherein the unique URL payment link is configured for allowing the customer computing system to establish communication with the order processing system over the network to provide sensitive payment information to the order processing system, wherein the sensitive payment information is provided in association with the purchase order;
receiving the sensitive payment information at the order processing system communicated from the customer computing system;
encrypting the sensitive payment information;
providing the encrypted sensitive payment information to the support help desk computing system, wherein the encrypted sensitive payment information is displayed in a masked format on a display of the support help desk computing system; and
completing the purchase order using the encrypted sensitive payment information.

* * * * *